US009755926B2

(12) United States Patent
Pasuparthy et al.

(10) Patent No.: US 9,755,926 B2
(45) Date of Patent: Sep. 5, 2017

(54) EFFICIENTLY UTILIZING PROBE PACKETS WITHIN A NETWORK

(71) Applicants: Suraj Pasuparthy, Santa Clara, CA (US); Rahul Patel, Fremont, CA (US); Sanjay Sreenath, San Jose, CA (US)

(72) Inventors: Suraj Pasuparthy, Santa Clara, CA (US); Rahul Patel, Fremont, CA (US); Sanjay Sreenath, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 211 days.

(21) Appl. No.: 14/496,274

(22) Filed: Sep. 25, 2014

(65) Prior Publication Data

US 2015/0365312 A1    Dec. 17, 2015

Related U.S. Application Data

(60) Provisional application No. 62/011,737, filed on Jun. 13, 2014.

(51) Int. Cl.
*G06F 15/173* (2006.01)
*H04L 12/26* (2006.01)

(52) U.S. Cl.
CPC .......... *H04L 43/08* (2013.01); *H04L 43/0858* (2013.01); *H04L 43/10* (2013.01)

(58) Field of Classification Search
CPC ...... H04L 43/08; H04L 43/10; H04L 43/0858
USPC ................................. 709/204, 220, 223, 224
See application file for complete search history.

(56) References Cited

U.S. PATENT DOCUMENTS

| | | | |
|---|---|---|---|
| 7,619,982 B2 | 11/2009 | Blair et al. | |
| 7,944,840 B2 | 5/2011 | Martin et al. | |
| 8,125,911 B2 | 2/2012 | Patel et al. | |
| 8,134,927 B2 | 3/2012 | Gamage et al. | |
| 2001/0050901 A1* | 12/2001 | Love | H04L 12/2602 370/235 |
| 2004/0133391 A1* | 7/2004 | Bovo | H04J 3/0682 702/178 |
| 2009/0040942 A1* | 2/2009 | Yang | H04L 12/2602 370/253 |
| 2009/0217291 A1* | 8/2009 | Errickson | G06F 11/0727 719/313 |
| 2011/0010585 A1* | 1/2011 | Bugenhagen | H04L 12/2697 714/32 |
| 2011/0064091 A1* | 3/2011 | Darras | H04J 3/0673 370/458 |
| 2012/0233308 A1 | 9/2012 | Van De Houten et al. | |
| 2014/0237107 A1* | 8/2014 | Ince | H04L 69/40 709/224 |

* cited by examiner

*Primary Examiner* — Joseph E Avellino
*Assistant Examiner* — Marshall McLeod
(74) *Attorney, Agent, or Firm* — P. Su

(57) ABSTRACT

According to one aspect, a method includes monitoring traffic between a first network element and a second network element, and determining when no packets have been sent from the first network element towards the second network element within a predetermined amount of time. When it is determined that no packets have been sent from the first network element towards the second network element within the predetermined amount of time, the method includes sending at least one smart probe packet from the first network element to the second network element.

21 Claims, 7 Drawing Sheets

EFFICIENTLY UTILIZING PROBE PACKETS WITHIN A NETWORK

CROSS REFERENCE TO RELATED APPLICATION

This application claims the benefit of U.S. Provisional Patent Application No. 62/011,737, filed Jun. 13, 2014 and entitled "Method and Apparatus for Efficiently Utilizing Probe Packets Within a Network," which is incorporated herein by reference in its entirety.

TECHNICAL FIELD

The disclosure relates generally to communication networks. More particularly, the disclosure relates to efficiently utilizing probe packets to monitor traffic within a network.

BACKGROUND

Network performance is typically measured either by monitoring actual traffic in a network, or by generating synthetic probes. Generating synthetic probes may involve various probing mechanisms such as probing mechanisms which use responders to reflect probe packets back to a source, after timestamps are inserted into the probe packets such that the source may compute statistics used to assess network performance.

Within a multi-site network, as probe packets are typically created on each site of the network, the proliferation of probe packets may lead to the usage of a significant amount of network resources, or network overhead, for purposes of monitoring network performance. As probing is typically scheduled at a specific time or times, probing may occur when network performance may instead be measured using actual traffic. Probing that occurs when it is possible to measure network performance using actual traffic may also result in the unnecessary use of network overhead.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

In one embodiment, a method includes monitoring traffic between a first network element and a second network element, and determining when no packets have been sent from the first network element towards the second network element within a predetermined amount of time. When it is determined that no packets have been sent from the first network element towards the second network element within the predetermined amount of time, the method includes sending at least one smart probe packet from the first network element to the second network element.

Description

By sending probe packets to assess network performance substantially only when network performance may not be measured using actual traffic, network overhead may be used more efficiently. The need to accommodate probe packets and/or to process probe packets to measure network performance may be substantially avoided when packets contained in actual traffic are available for use to measure network performance. When there is traffic between two network elements, that traffic may be used to efficiently measure network performance. When there is no traffic detected as being sent from one network element towards the other network element for a predetermined amount of time, smart probe packets may sent and used to assess network performance. That is, smart probe packets are used to measure network performance substantially after a period of time in which there is no actual traffic that may be used to measure network performance.

In one embodiment, to further reduce the amount of network overhead needed to measure network performance, smart probe packets are not reflected back to a sender. That is, a smart probe packet sent from a source to a destination generally does not result in a response packet being returned from the destination to the source.

Figure 1:
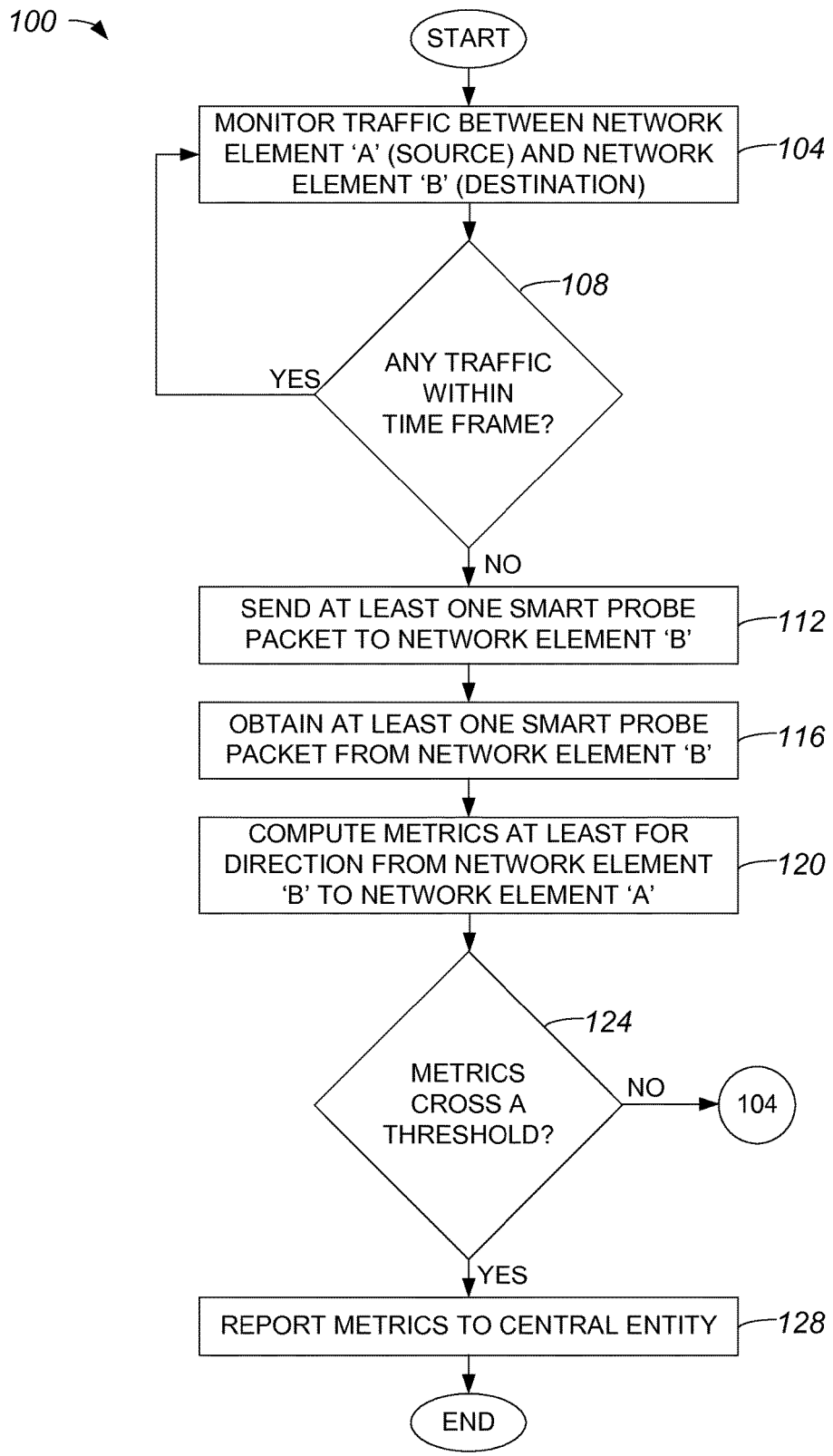
FIG. 1 is a process flow diagram which illustrates a process of utilizing smart probes in accordance with an embodiment.

Referring initially to FIG. 1, a process of utilizing smart probes, or smart probe packets, will be described in accordance with an embodiment. A process 100 of utilizing smart probe packets begins at step 104 in which traffic between a source and a destination in a network, e.g., between network element 'A' and network element 'B', is monitored. That is, a communications interface between network element 'A' and network element 'B' is monitored.

A determination is made in step 108 as to whether any traffic sent from network element 'A' towards network element 'B' has been detected within a particular time frame or interval, e.g., within a predetermined time period. For instance, it may be determined whether traffic sent from network element 'A' towards network element 'B' has been detected within a certain number of milliseconds or seconds, e.g., within approximately 500 milliseconds.

If the determination in step 108 is that traffic has been detected within the particular time frame or interval, then process flow returns to step 104 in which traffic continues to be monitored. Alternatively, if the determination in step 108 is that no traffic has been detected within the particular time frame or interval, the indication is that smart probe packets are to be sent from network element 'A' to network element 'B'. Hence, process flow moves from step 108 to step 112 in which at least one smart probe packet is sent by network element 'A' to network element 'B'. As will be discussed below with respect to FIGS. 2 and 3, smart probe packets may include packets which are sent in a relatively short burst and packets which are sent periodically at particular intervals.

In the described embodiment, network element 'A' obtains at least one smart probe packet from network element 'B' in step 116. It should be appreciated that the smart probe packet obtained from network element 'B' is not sent in response to the smart probe packet sent by network element 'A' to network element 'B'. That is, the smart probe packet obtained from network element 'B' is generally not a reflected packet or a response packet.

Metrics are computed in step 120 at least for a direction, e.g., a communications direction, from network element 'B' to network element 'A'. Any suitable metrics may generally be computed or otherwise determined. Computing metrics may include, but is not limited to including, calculating a round-trip time for communications between network element 'A' and network element 'B', and/or calculating a one-way delay time associated with the communications. Metrics computed using information contained in smart probe packets may facilitate detecting if a particular network element is reachable, as well as a reachability accuracy, e.g., such that it may be determine whether a particular network element is unreachable in less than approximately one second. One method of computing metrics will be described below with respect to FIG. 5.

After metrics are computed or otherwise determined in step 120, it is determined in step 124 whether the calculated metrics effectively cross a threshold. In other words, it is determined whether the calculated metrics are to be reported, as for example to a central entity within the network. The threshold may be set to effectively prevent metrics from being unnecessarily reported. The threshold may specify, but is not limited to specifying, a round-trip time that is considered to be unacceptable and/or a one-way delay time that is considered to be unacceptable. It should be understood that threshold may generally have any suitable value. By way of example, a threshold for a one-way delay may be configured to be approximately 250 milliseconds. Unacceptable round-trip times and unacceptable one-way delay times may be times that are too long or longer than desired.

If it is determined in step 124 that the metrics do not cross a threshold, then the indication is that the metrics are not to be reported to a central entity. As such, process flow returns to step 104 in which traffic between network element 'A' and network element 'B' continues to be monitored. Alternatively, if it is determined in step 124 that the metrics cross a threshold, then the metrics are reported to a central entity in step 128, and the process of utilizing smart probe packets is completed. It should be appreciated that the metrics may be reported by network element 'A'.

As previously mentioned, smart probe packets may include on-demand probe packets and periodic probe packets. Both on-demand probe packets and periodic probe packets may be generated and sent when no traffic is detected on an interface from one network element, e.g., network element 'A', towards another network element, e.g., network element 'B'. Both on-demand probe packets and periodic probe packets generally include the same information. In one embodiment, on-demand probe packets and periodic probe packets generally have the format of a real-time transport protocol (RTP) packet, It should be appreciated, however, that on-demand probe packets and periodic probe packets are not limited to being formatted as RTP packets and may, instead, be formatted as any suitable packet.

Figure 2:
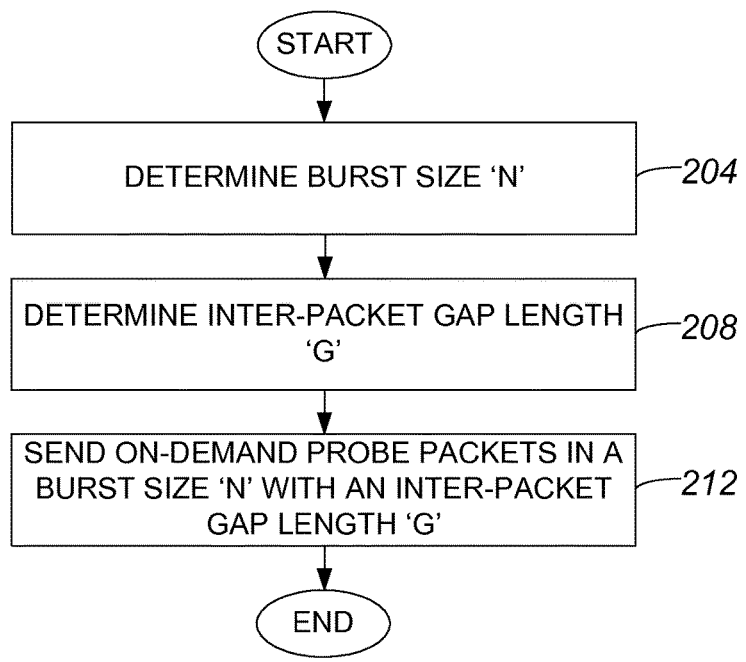
FIG. 2 is a process flow diagram which illustrates a method sending smart probes on-demand, e.g., step 112 of FIG. 1, in accordance with an embodiment.

On-demand probe packets, which are generally triggered when there is a predetermined amount of time during which essentially no traffic is sent from one network element towards another network element, are packets which are sent in a particular burst size and with a particular inter-packet gap. In other words, after a time period in which substantially no traffic is sent from one network element towards another network element, on-demand probe packets may be sent. FIG. 2 is a process flow diagram which illustrates a method of sending smart probe packets on-demand, e.g., step 112 of FIG. 1, in accordance with an embodiment. A process 112' of sending on-demand probe packets begins at step 204 in which a burst size 'N' is determined, e.g., by searching an appropriate database. The burst size 'N' effectively specifies how many on-demand probe packets are to be sent.

After the burst size 'N' is determined, an inter-packet gap length 'G' may be determined in step 208. The inter-packet gap length 'G', which effectively specifies an amount of time between consecutive on-demand probe packets being sent, may also be identified by searching an appropriate database. In one embodiment, the inter-packet gap length 'G' may be on the order of milliseconds.

Once the inter-packet gap length 'G' is determined, at least one on-demand probe packet is sent in step 212. A number of on-demand probe packets substantially equal to the burst size 'N' may be sent, with consecutive on-demand probe packets sent at intervals approximately equal to the inter-packet gap length 'G'. Upon sending the on-demand probe packets, the process of sending on-demand probe packets is completed.

Periodic probe packets may also be created and sent when essentially no traffic has been detected on an interface from one network element towards another network element within a particular time period or interval. In one embodiment, when there continues to be essentially no traffic detected on an interface from one network element to another network element, on-demand packets may continue to be used to assess network performance. In such an embodiment, when traffic is detected on the interface from one network element to another network element after essentially no traffic has been detected on the interface during the particular time period or interval, periodic probe packets may be created and sent. That is, in one embodiment, when traffic has been detected as being sent from one network element to another network element within a particular time period or interval, while on-demand probes may not be sent, periodic probes may continue to be sent periodically.

Figure 3:
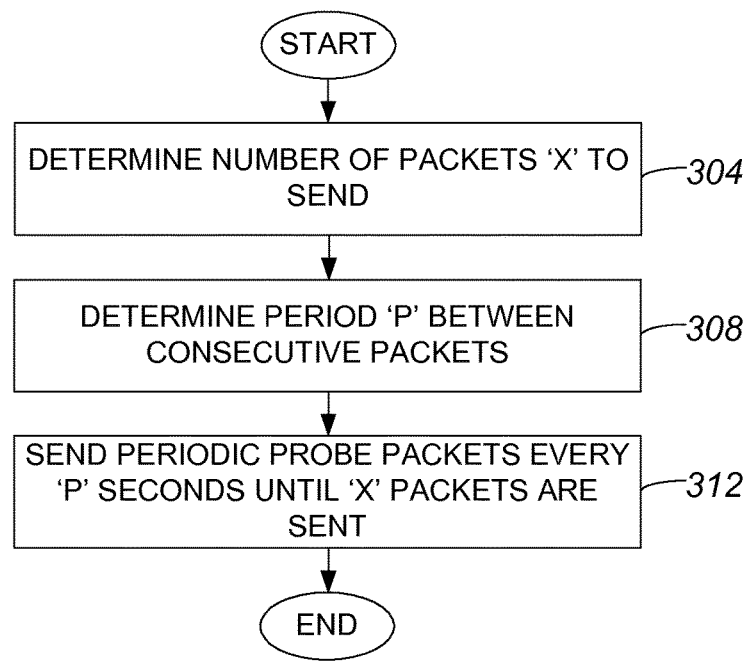
FIG. 3 is a process flow diagram which illustrates a method of sending smart probes periodically, e.g., step 112 of FIG. 1, in accordance with an embodiment.

FIG. 3 is a process flow diagram which illustrates a method of sending periodic probe packets, e.g., step 112 of FIG. 1, in accordance with an embodiment. A process 112" of sending periodic probe packets begins at step 304 in which a number of period probe packets 'X' to send from one network element to another network element may be determined, e.g., by searching an appropriate database. It should be appreciated that in lieu of searching an appropriate database for a number of packets 'X' to send, the number of packets 'X' to send may instead be calculated, e.g., pre-computed.

In one embodiment, periodic probe packets may be sent even when there is traffic detected within a particular time frame or interval. In such an embodiment, a number of packets 'X' may be substantially unlimited. For example, a periodic probe may be sent periodically every few seconds, while an on-demand probe may be sent substantially only when no packet has been detected as being sent between network elements within a particular time frame or interval. It should be appreciated that the use of periodic probe packets may allow a network element to detect the reachability of another network element at a sub-second level, e.g., in less than approximately one second, even if there is no actual traffic on a network for a predetermined amount of time.

Once the number of packets 'X' to send is determined in step 304, a period 'P' between consecutive packets may be determined in step 308. The period 'P', which effectively specifies an amount of time between consecutive periodic probe packets being sent, may also be identified by searching an appropriate database. In one embodiment, the period 'P' may be on the order of seconds.

At least one periodic probe packet is sent in step 312. When multiple periodic probe packets are sent, as for example when the number of packets 'X' is greater than one, the multiple periodic probe packets may be sent such that consecutive periodic probe packets are sent at intervals approximately equal to the period 'P'. In one embodiment, periodic probe packets may be sent every 'P' seconds until 'X' packets have been sent. In another embodiment, period probe packets may be sent every 'P' seconds with substantially no limit on a number of periodic probe packets to send. Upon sending the periodic probe packets, the process of sending periodic probe packets is completed.

Figure 4:
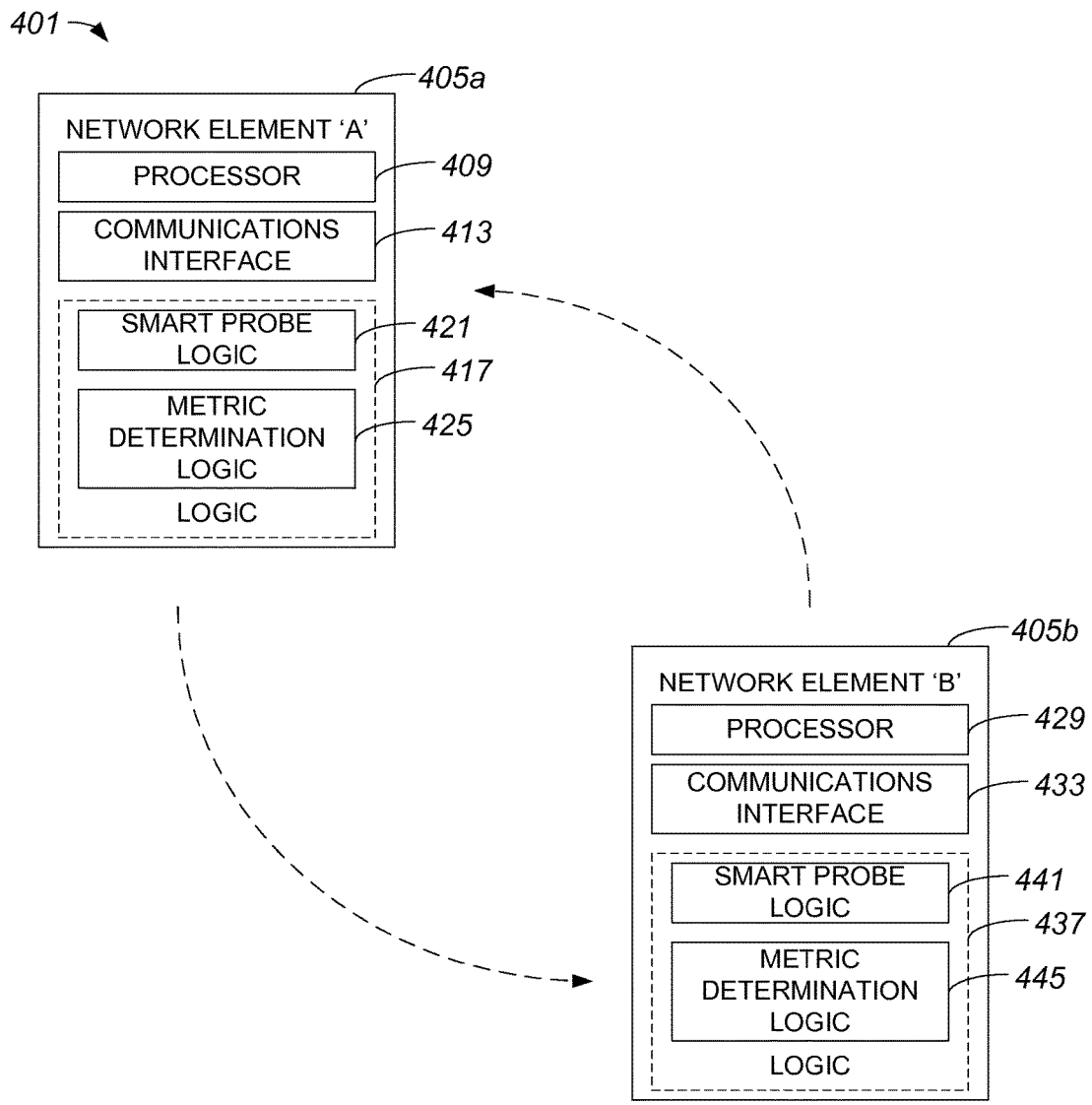
FIG. 4 is a diagrammatic representation of a network in which network elements are configured to send and/or to receive smart probes in accordance with an embodiment.

Within a network, any suitable network element may support sending and/or receiving smart probe packets. Suitable network elements generally include, but are not limited to including, computer systems, switches, routers, and the like. With reference to FIG. 4, a network in which network elements are configured to send and/or to receive smart probes will be described in accordance with an embodiment. A network 401 generally includes a plurality of network elements including network element 'A' 405a and network element 'B' 405b. Network element 'A' 405a and network element 'B' 405b are generally configured to communicate with each other through across network 401, e.g., wirelessly and/or using a physical communications link. If network element 'A' 405a is a source while network element 'B' 405b is a destination, then when network element 'A' 405a determines that substantially no traffic has been sent by network element 'A' 405a towards network element 'B' 405b during a particular time period.

Smart probe packets sent between network element 'A' 405a and network element 'B' 405b may be sent asynchronously. As a result, network element 'A' 405a may compute metrics relating to smart probe packets sent from network element 'B' 405b to network element 'A' 405a, while network element 'B' 405b may compute metrics relating to smart probe packets sent from network element 'A' 405a to network element 'B' 405b.

Network element 'A' 405a includes a processor 409, a communications interface 413, and logic 417. Processor 409 is configured to execute software logic or program code devices included in logic 417. Communications interface 413 is configured to allow network element 'A' 405a to communicate with other elements, e.g., network element 'B' 405b and a central entity (not shown), wirelessly and/or through the use of wired connections (not shown). Communications interface 413 may include at least one input/output (I/O) port that allows network element 'A' 405a to obtain packets through network 401 and to provide packets to network 401.

Logic 417 is generally configured, or otherwise arranged, to allow network element 'A' 405a to provide packets to communications interface 413, obtain to packets from communications interface 413, and/or to process packets. In the described embodiment, logic 417 includes smart probe logic 421 and metric determination logic 425. Smart probe logic 421, or a smart probe logic module, is configured to determine when it is appropriate to send smart probe packets, as well as to generate and to send smart probe packets, e.g., on-demand probe packets and periodic probe packets. Metric determination logic 425, of a metric determination logic module, is configured to obtain information relating to smart probes obtained by and provided by network element 'A' 405a, and to calculate metrics which may be used to assess or effectively measure performance within network 401. Metric determination logic 425 may also cause metrics to be reported, as for example to a central facility (not shown), when thresholds are crossed. Metrics may include, but are not limited to including, round-trip times associated with network 401 and one-way delay times associated with network 401. Metric determination logic 425 may also efficiently determine whether a particular network element is reachable, e.g., in a time period that is on the order of milliseconds.

In one embodiment, network element 'B' 405b and network element 'A' 405a may be substantially the same, e.g., substantially the same in terms of functionality. Network element 'B' 405b includes a processor 439, a communications interface 443, and logic 437. Processor 429 is configured to execute software logic or program code devices included in logic 437. Communications interface 433 is configured to allow network element 'B' 405b to communicate with other elements, e.g., network element 'A' 405a, wirelessly and/or through the use of wired connections (not shown). Communications interface 423 may include at least one I/O port that allows network element 'B' 405b to obtain packets through network 401 and to provide packets to network 401.

Logic 437 generally allows network element 'B' 405b to provide packets to communications interface 433, to obtain packets from communications interface 433, and/or to process packets. In the described embodiment, logic 437 includes smart probe logic 441 and metric determination logic 445. Smart probe logic 441 is configured to determine when it is appropriate to send smart probe packets, as well as to generate and to send smart probe packets, e.g., on-demand probe packets and periodic probe packets. Metric determination logic 445 is configured to obtain information relating to smart probes obtained by and provided by network element 'B' 405b, and to calculate metrics which may be used to assess or effectively measure performance within network 401. Metric determination logic 445 may also cause metrics to be reported, as for example to a central facility (not shown), when thresholds are crossed.

While network element 'A' 405a and network element 'B' 405b may include the same components and have substantially the same functionality, it should be understood that network element 'A' 405a and network element 'B' 405b may have different components and/or may have different functionality. While network element 'A' 405a and network element 'B' 405b may have different functionality, both network element 'A' 405a and network element 'B' 405b are configured to support smart probes.

Figure 5:
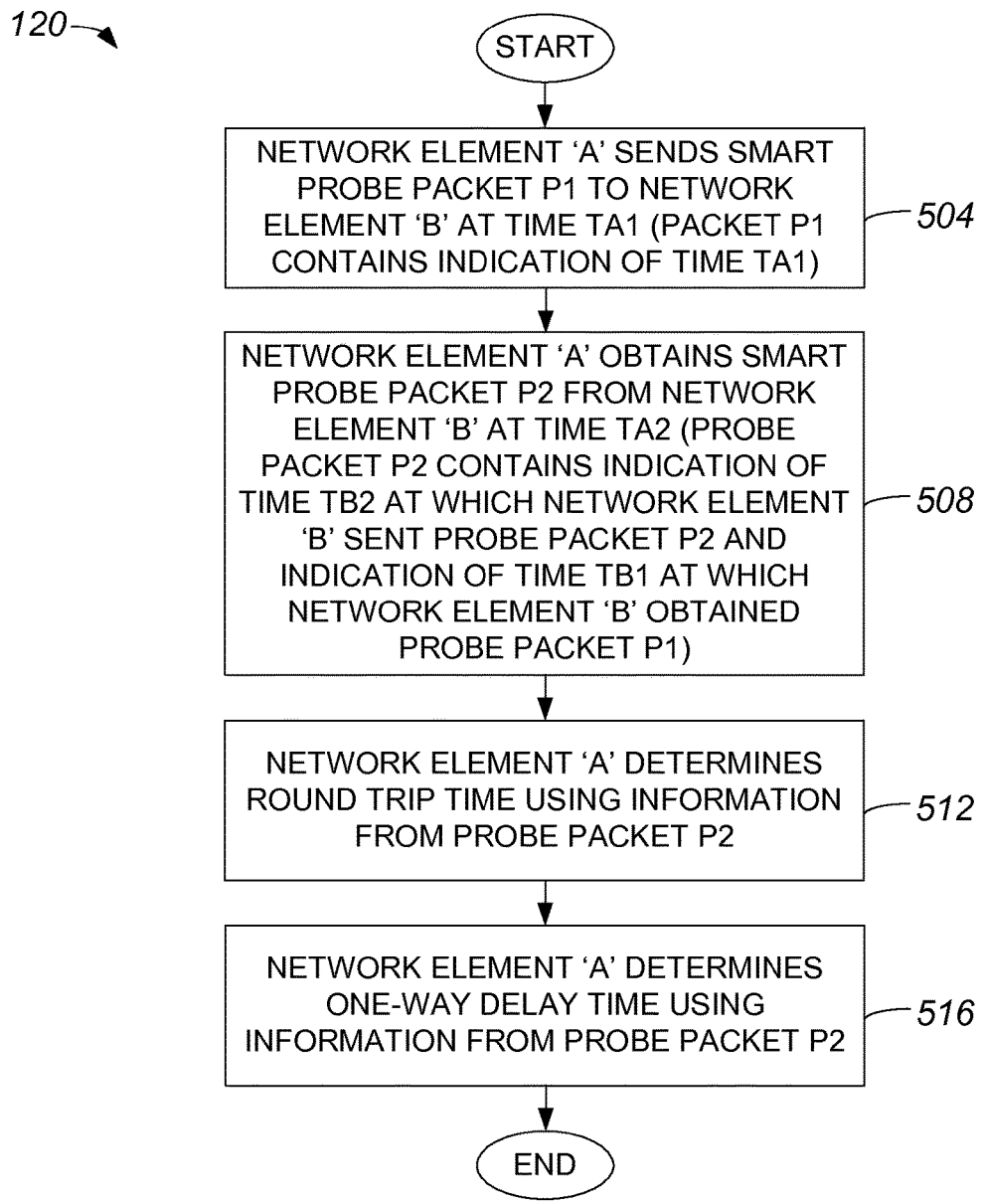
FIG. 5 is a process flow diagram which illustrates a method of computing metrics using information associated with smart probes, e.g., step 120 of FIG. 1, in accordance with an embodiment.

Referring next to FIG. 5, a method of computing metrics using information provided by smart probe packets, e.g., step 120 of FIG. 1, will be described in accordance with an embodiment. A method 120 of computing metrics based on information provided by smart probe packets begins at step 504 in which network element 'A' sends a smart probe packet P1 to network element 'B' at a time TA1. An indication of time TA1 is provided in a payload of smart probe packet P1. Suitable smart probe packet will be described below with reference to FIG. 6 and to FIG. 7.

Once network element 'A' sends smart probe packet P1 to network element 'B', network element 'A' obtains a smart probe packet P2 from network element 'B' at a time TA2 in step 508. Smart probe packet P2 includes an indication of a time TB2 at which network element 'B' sent smart probe packet P2, as well as an indication of a time TB1 at which network element 'B' obtained probe packet P1.

Upon obtaining smart probe packet P2, network element 'A' determines a round trip time in step 512 using the information contained in smart probe packet P2. Then, in step 516, network element 'A' determines a one-way delay time using information contained in smart probe packet P2, and the method of computing metrics based on information provided by smart probe packets is completed.

Figure 6:
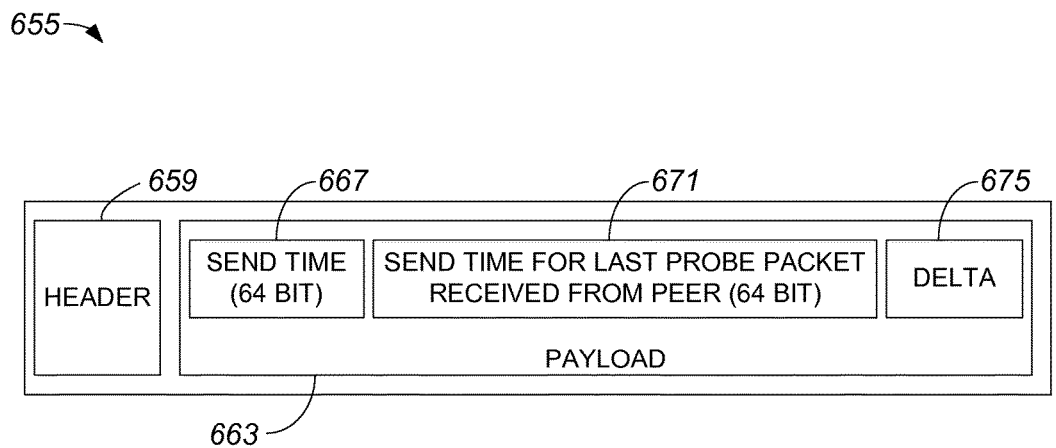
FIG. 6 is a diagrammatic representation of a first smart probe packet in accordance with an embodiment.

The format of a smart probe packet may vary. Examples of suitable smart probe packets will be described with respect to FIG. 6 and to FIG. 7. With reference to FIG. 6, one example of a suitable smart probe packet will be described in accordance with an embodiment. A smart probe packet 655 includes a header 659 and a payload 663. Generally, header 659 includes control information, while payload 663 includes data. In one embodiment, smart probe packet 655 may be an RTP packet, although it should be appreciated that smart probe packet 655 is not limited to being an RTP packet.

Payload 663 includes a send time 667, or a time at which packet 655 is sent by a sender. Send time 667 is effectively recorded in packet 655 by the sender. Also included in payload 663 are a send time 671 for a last probe packet received from a peer, and a delta 675. Delta 675 is typically a difference between a time at which packet 655 is sent and a time which a last probe packet was sent by the peer.

In one embodiment, delta 675 is effectively a processing time on a particular element. To calculate delta 675 on a network element, e.g., network element 'A', the network element may determine a time elapsed between receiving or otherwise obtaining a smart probe packet from another network element, e.g., network element 'A', and sending or otherwise providing a smart probe to the other network element, As a result, it may not be necessary for network elements to be synchronous.

Any suitable method may be used to determine or to calculate a round trip time. Suitable method may include using delta 675. By way of example, to calculate a round trip time between network element 'A' and network element 'B' based on a smart probe packet received on network element 'A', information contained in the smart probe packet as well as a time at which the smart probe packet was received may be used. For example, send time 671, delta 675, and the time at which the smart probe packet was received may be used to determine a round trip time.

Figure 7:
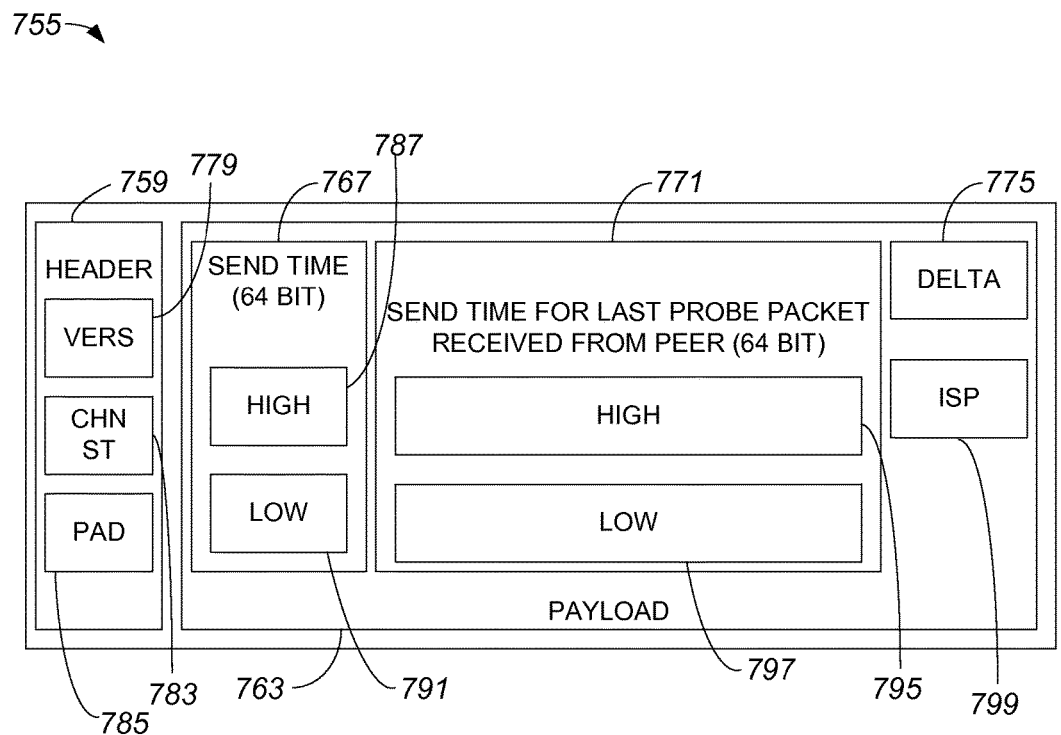
FIG. 7 is a diagrammatic representation of a second smart probe packet in accordance with an embodiment.

Information contained in a header of a smart probe packet, a send time, and a send time for a last probe may be provided in any suitable format. FIG. 7 is a diagrammatic representation of a smart probe packet that shows contents of a header in accordance with an embodiment. A smart probe packet 755 includes a header 679 and a payload 763. In one embodiment, smart probe packet 755 may be an RTP packet, although it should be appreciated that smart probe packet 755 is not limited to being an RTP packet.

Header 759 includes a version 779, a channel state 783, and padding 785. Version 779 may identify a version of RTP when smart probe packet 755 is an RTP packet. Channel state 783 may identify whether a particular channel is discovered or initiated. A channel may be a combination of a service provider, a network element, and/or a Differentiated Services Code Point (DSCP). When channel state 783 indicates that it is discovered, the implication is that a particular channel has been opened for sending smart probe packets to another network element in response to receiving a smart probe packet from the other network element. When channel state 783 indicates that it is initiated, the implication is that a network element has initiated a channel to send probes to another network element, e.g., because there is traffic going from the network element to the other network element over a particular DSCP. Padding 785 may be set to indicate that smart probe packet 755 contains a number of padding octets substantially at the end that are not part of payload 763.

Payload 763 includes a send time 767, or a time at which packet 755 is sent by a sender. Send time 767 is effectively recorded in smart probe packet 755 by the sender, and may be stored as high bits 787 and low bits 791. Payload 763 also includes a send time 771 for a last probe packet received from a peer which may be stored as high bits 795 and low bits 797. Finally, payload may include a delta 775 and an Internet Service Provider (ISP) identifier 799. Delta 775 is typically a difference between a time at which smart probe packet 755 is sent and a time which a last probe packet was sent by the peer. ISP identifier 799 identifies an ISP from which smart probe packet 755 is sent.

In general, smart probes or smart probe packets may be sent based on a triggering event, e.g., a lack of traffic on an interface for more than a specified amount of time. Thus, the use of smart probes allows network performance to be measured or otherwise determined substantially only when network performance may not be passively measured by monitoring actual traffic. When smart probes sent from a first network element to a second network element are not synchronized with smart probes sent from the second network element to the first network element, i.e., when smart probes in each direction are substantially asynchronous, probe traffic within a network may be reduced as response packets for every probe packet are not necessary.

Although only a few embodiments have been described in this disclosure, it should be understood that the disclosure may be embodied in many other specific forms without departing from the spirit or the scope of the present disclosure. By way of example, while the generation of smart probes or smart probe packets has been described as being substantially triggered based upon a lack of traffic sent from one network element towards another network element within a predetermined time period or amount of time, other events may also substantially trigger the generation of smart probes or smart probe packets. That is, events other than a length of time during which no traffic is detected as being sent from a source towards a destination may be used to initiate the use of smart probes to measure network performance.

While a RTP packet has been described as one embodiment of a smart probe packet, it should be appreciated that smart probe packets are not limited to being RTP packets. In general, smart probe packets may include substantially any packets which may be identified by a sequence number and/or a time stamp.

Smart probe packets sent periodically and smart probe packets sent on demand have generally been described as having substantially the same format. It should be understood, however, that periodic smart probe packets and on-demand smart probe packets are not limited to having substantially the same format. In other words, the format of periodic smart probe packets may differ from the format of on-demand start probe packets without departing from the spirit or the scope of this disclosure.

In a network which utilizes smart probe packets, both on-demand smart probe packets and periodic smart probe packets may be sent. That is, upon detecting that substantially no packets have been sent from one network element to another network element, it may be determined that both on-demand smart probe packets and periodic smart probe packets are to be sent. Alternatively, in lieu of generating and sending both on-demand smart probe packets and periodic smart probe packets, it may be determined that either on-demand smart probe packets or periodic smart probe packets are to be sent.

It should be appreciated that while network elements between which smart probe packets are sent may be clock synchronized or time synchronized, the use of smart probe packets is such that network elements do not need to be clock synchronized or time synchronized. In other words, clocks associated with a first network element and a second network element that are capable of sending smart probe packets to each other do not need to be synchronized, as a round-trip time and other metrics may be calculated using information contained in smart probe packets.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   monitoring traffic between a first network element and a second network element, the first network element and the second network element being on a network;
   determining when no packets have been sent from the first network element towards the second network element within a predetermined amount of time; and
   when it is determined that no packets have been sent from the first network element towards the second network element within the predetermined amount of time, sending at least a first smart probe packet from the first network element to the second network element at a first time, the first smart probe packet including the first time and information associated with when a last packet was obtained from the second network element.

2. The method of claim 1 further including:
   obtaining at least a second smart probe packet on the first network element, the second smart probe packet being obtained from the second network element, wherein the second smart probe packet includes a second time and an indication of a third time, the second time being a time at which the second smart probe packet was sent, the indication of the third time being arranged to indicate when the first smart probe packet arrived on the second network element.

3. The method of claim 2 wherein the second smart probe packet further includes the first time.

4. The method of claim 2 further including:
   computing at least one metric associated with the network, wherein computing the at least one metric includes using at least the second time and the third time to compute the at least one metric.

5. The method of claim 4 wherein the at least one metric is at least one selected from a group including a round-trip time for communications between the first network element and the second network element, and a one-way delay time associated with the communications between the first network element and the second element.

6. A method comprising:
   monitoring traffic between a first network element and a second network element, the first network element and the second network element being on a network;
   determining when no packets have been sent from the first network element towards the second network element within a predetermined amount of time;
   when it is determined that no packets have been sent from the first network element towards the second network element within the predetermined amount of time, sending at least a first smart probe packet from the first network element to the second network element at a first time; and
   sending at least a second smart probe packet from the first network element towards the second network element after sending the first smart probe packet, wherein the first smart probe packet is a first on-demand probe packet and the second smart probe packet is at least a second on-demand probe packet, and wherein sending the first smart probe packet from the first network element to the second network element includes determining a burst size and an inter-packet gap length, wherein the second smart probe packet is sent at the inter-packet gap length after the first smart probe packet, and wherein the first smart probe packet and the second smart probe packet are included in a burst of on-demand probe packets of the burst size.

7. The method of claim 1 wherein the first smart probe packet is a periodic smart probe packet, the method further including:
   determining a time period, the time period being measured as a number of seconds; and
   sending a second periodic smart probe packet at a second time, the second time being after the first time by the number of seconds.

8. A tangible, non-transitory computer-readable medium comprising computer program code, the computer program code, when executed, configured to:
monitor traffic between a first network element and a second network element, the first network element and the second network element being on a network;
determine when no packets have been sent from the first network element towards the second network element within a predetermined amount of time; and
when it is determined that no packets have been sent from the first network element towards the second network element within the predetermined amount of time, send at least a first smart probe packet from the first network element to the second network element at a first time, the first smart probe packet including the first time and information associated with when a last packet was obtained from the second network element.

9. The tangible, non-transitory computer-readable medium comprising computer program code of claim 8 wherein the computer program code is further configured to:
obtain at least a second smart probe packet on the first network element, the second smart probe packet being obtained from the second network element, wherein the second smart probe packet includes a second time and an indication of a third time, the second time being a time at which the second smart probe packet was sent, the indication of the third time being arranged to indicate when the first smart probe packet arrived on the second network element.

10. The tangible, non-transitory computer-readable medium comprising computer program code of claim 9 wherein the second smart probe packet further includes the first time.

11. The tangible, non-transitory computer-readable medium comprising computer program code of claim 9 wherein the computer program code is further configured to:
compute at least one metric associated with the network, wherein to computer program code configured to compute the at least one metric includes computer program code configured to use at least the second time and the third time to compute the at least one metric.

12. The tangible, non-transitory computer-readable medium comprising computer program code of claim 11 wherein the at least one metric is at least one selected from a group including a round-trip time for communications between the first network element and the second network element, and a one-way delay time associated with the communications between the first network element and the second element.

13. A tangible, non-transitory computer-readable medium comprising computer program code, the computer program code, when executed, configured to:
monitor traffic between a first network element and a second network element, the first network element and the second network element being on a network;
determine when no packets have been sent from the first network element towards the second network element within a predetermined amount of time;
when it is determined that no packets have been sent from the first network element towards the second network element within the predetermined amount of time, send at least a first smart probe packet from the first network element to the second network element at a first time; and
send at least a second smart probe packet from the first network element towards the second network element after sending the first smart probe packet, wherein the first smart probe packet is a first on-demand probe packet and the second smart probe packet is at least a second on-demand probe packet, and wherein the computer program code configured to send the first smart probe packet from the first network element to the second network element is configured to determine a burst size and an inter-packet gap length, wherein the second smart probe packet is sent at the inter-packet gap length after the first smart probe packet, and wherein the first smart probe packet and the second smart probe packet are included in a burst of on-demand probe packets of the burst size.

14. The tangible, non-transitory computer-readable medium comprising computer program code of claim 8 wherein the first smart probe packet is a periodic smart probe packet, and wherein the computer program code is further configured to:
determine a time period, the time period being measured as a number of seconds; and
send a second periodic smart probe packet at a second time, the second time being after the first time by the number of seconds.

15. An apparatus comprising:
a communications interface, the communications interface being configured to allow the apparatus to communicate on a network;
a storage;
logic, logic configured to be embodied in the storage, the logic including a smart probe logic module, the smart probe logic module being configured to determine if any traffic has been detected between a first network element and a second network element within a predetermined time frame, the smart probe logic module further being configured to send at least a first smart probe packet from the first network element to the second network element at a first time if it is determined that no traffic has been detected between the first network element and the second network element within the predetermined time frame, the at least first smart probe packet being one packet included in a burst of packets; and
a processor configured to execute the logic.

16. The apparatus of claim 15 wherein the apparatus is the first network element.

17. The apparatus of claim 16 wherein the smart probe logic module is further configured to obtain at least a second smart probe packet on the first network element, the second smart probe packet being obtained from the second network element, wherein the second smart probe packet includes a second time and an indication of a third time, the second time being a time at which the second smart probe packet was sent, the indication of the third time being arranged to indicate when the first smart probe packet arrived on the second network element.

18. The apparatus of claim 17 wherein the logic further includes a metric determination logic module, the metric determination logic configured to compute at least one metric associated with the network, wherein the metric determination logic is configured to compute the at least one metric associated with the network using at least the second time and the third time.

19. The apparatus of claim 15 wherein the logic is further configured to detect reachability of the second network element.

20. The method of claim 6 wherein the first smart probe packet and the second smart probe packet are periodic smart probe packets, wherein the second smart probe packet is sent at a second time, the second time being after the first time by the inter-packet gap length.

21. The tangible, non-transitory computer-readable medium comprising computer program code of claim 13 wherein the first smart probe packet and the second smart probe packet are periodic smart probe packets, wherein the second smart probe packet is sent at a second time, the second time being after the first time by the inter-packet gap length.

* * * * *